Nov. 18, 1941.　　　　S. B. WINN　　　　2,263,114
FIFTH WHEEL MOUNTING
Filed Sept. 5, 1939　　　　3 Sheets-Sheet 1
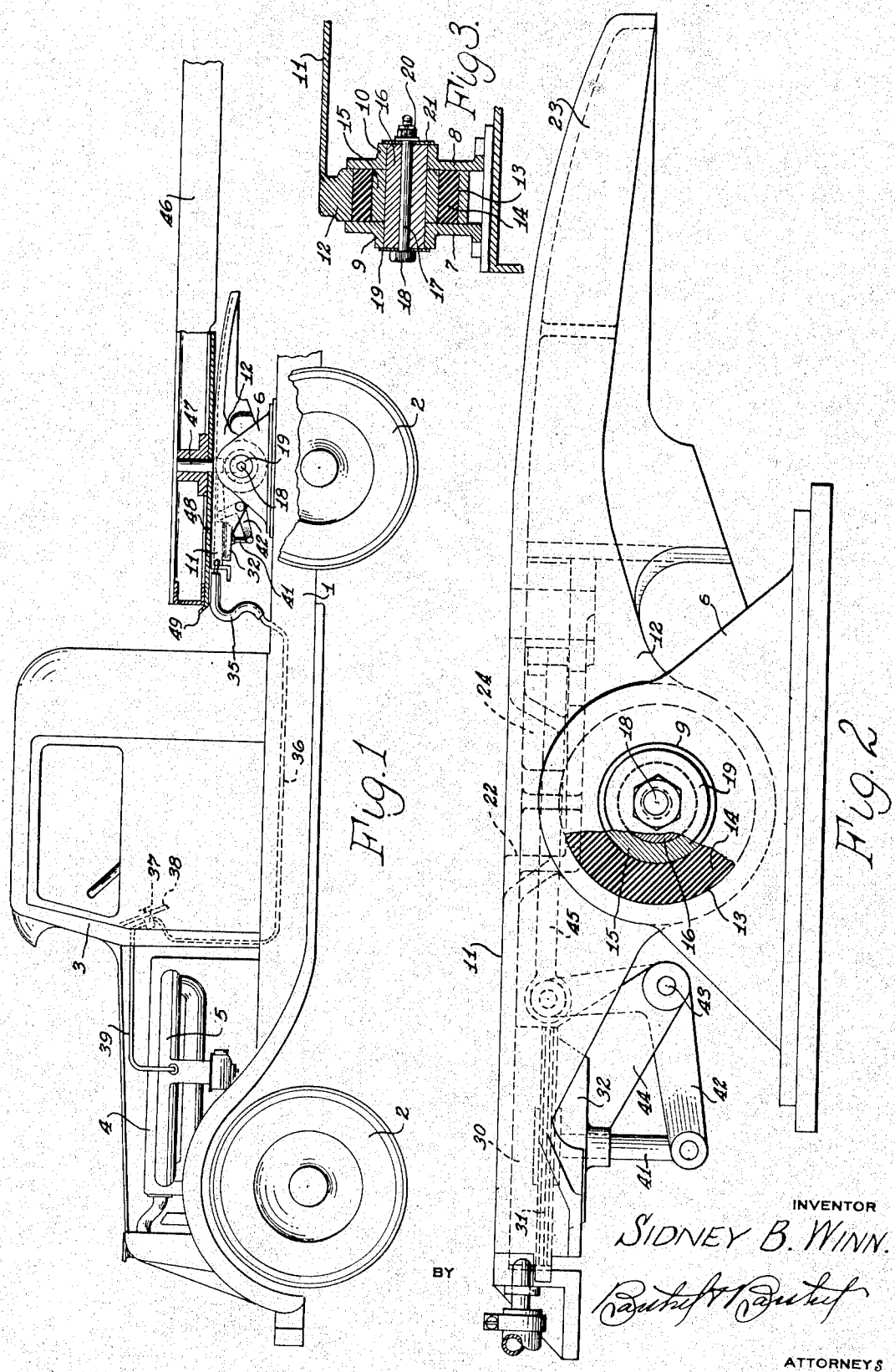
INVENTOR
SIDNEY B. WINN.
BY
ATTORNEYS

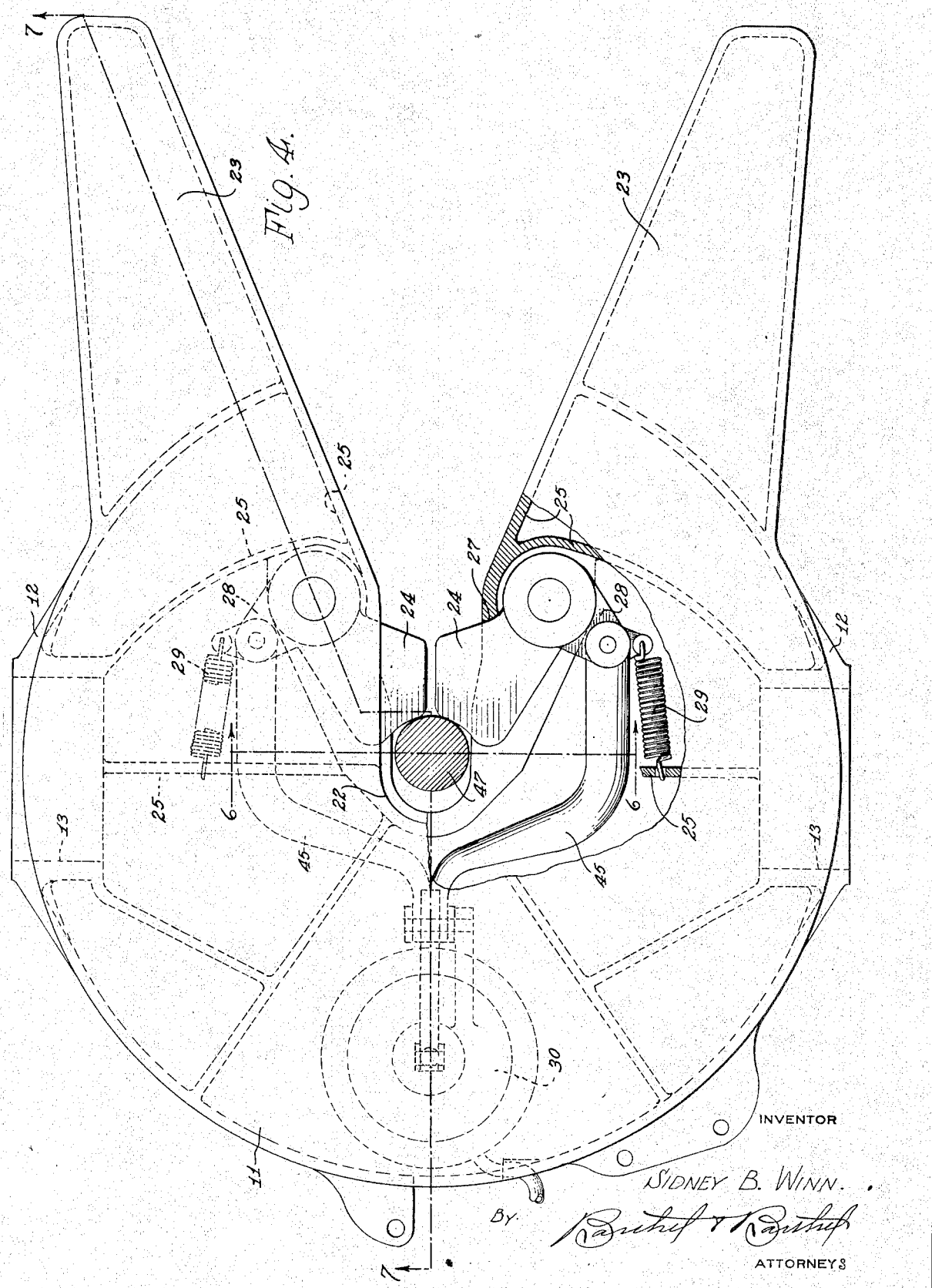

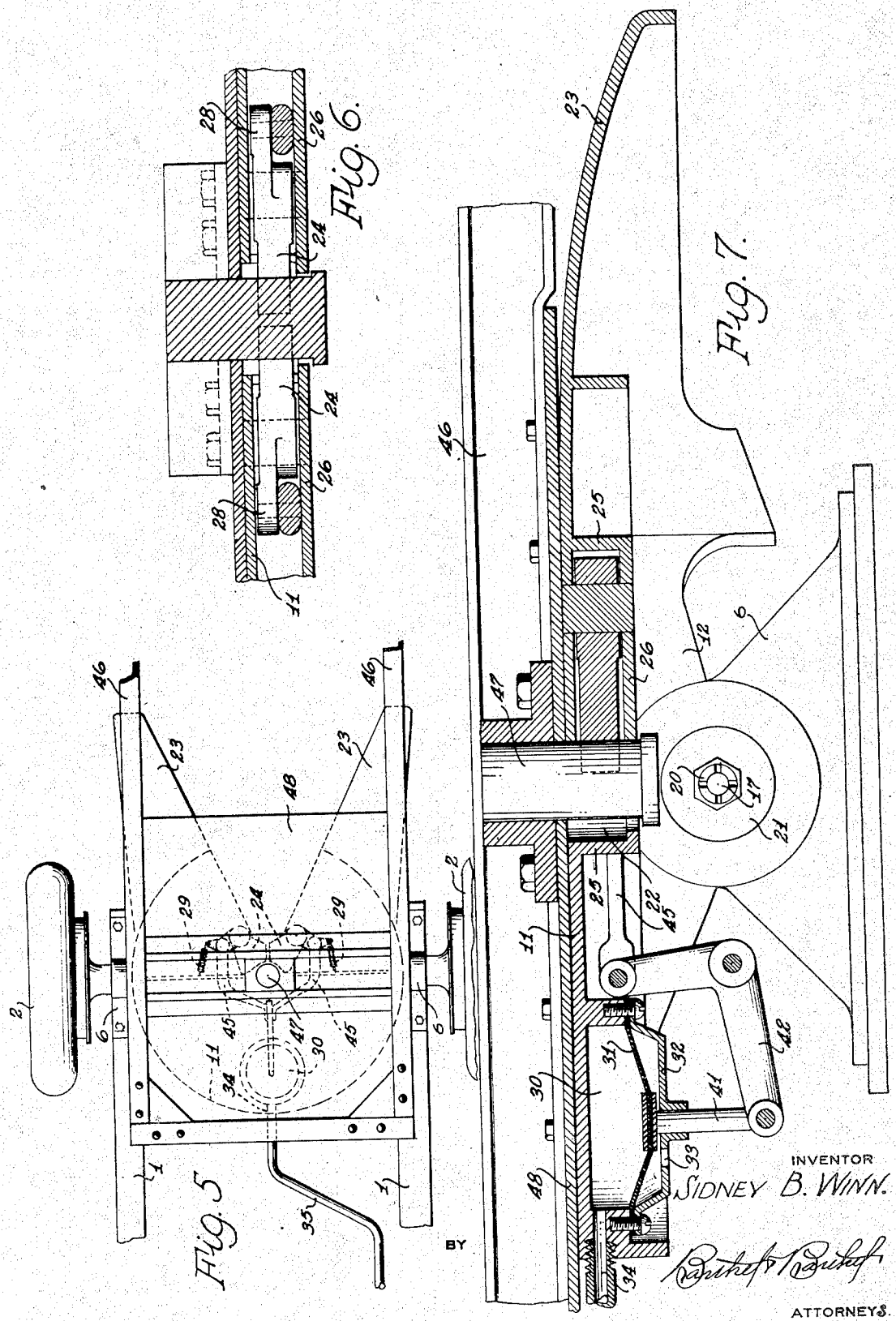

Patented Nov. 18, 1941

2,263,114

UNITED STATES PATENT OFFICE 2,263,114

FIFTH WHEEL MOUNTING

Sidney B. Winn, Lapeer, Mich.

Application September 5, 1939, Serial No. 293,408

1 Claim. (Cl. 280—33.1)

The present invention pertains to a novel fifth wheel and coupling mechanism of a type particularly adapted for connecting a semi-trailer to a tractor.

The primary object of the present invention is to provide a flexible pivot for a fifth wheel in a tractor trailer combination, such flexible pivot including a rubber sleeve which is interposed between the pivot pin and the means on the fifth wheel received on the pivot pin. In this connection it is further desirable to protect such rubber member from the elements and foreign matters having a tendency to detract from its flexibility or reduce its useful life.

Another object of the present invention is to provide a fifth wheel for attachment to a tractor and coupling jaws associated therewith for receiving a king pin on the forward end of the trailer and for holding the trailer in coupled relation thereto, the fifth wheel embodying a novel mounting wherein the desired pivotal movement necessary for coupling and uncoupling operations is derived through a flexible resilient mounting which absorbs considerable of the shocks incident to coupling operations, which shocks are ordinarily quite severe.

Another object of the present invention is to provide a fifth wheel for reception of a king pin on a trailer and coupling jaws for engaging the received king pin to prevent its removal, and in combination therewith, a pneumatic means operable from the cab of the tractor for moving the coupling jaws to permit removal of the king pin from the fifth wheel. In this connection the coupling jaws are normally held by resilient means in their position of engagement so that during coupling operations the jaws are permitted to move as a result of the relative movement of the king pin and fifth wheel but once the king pin is in its coupled position the jaws engage the same so that it cannot be removed without operating the pneumatic means which retracts the coupling jaws against the urge of the resilient means.

With the above and other ends in view the invention consists in matters hereinafter set forth and more particularly pointed out in the appended claim, reference being had to the accompanying drawings, in which—

Figure 1 is a side elevation of a tractor illustrating a fragment of a trailer coupled thereto;

Fig. 2 is an enlarged side elevation of the fifth wheel, partly broken away and in cross section;

Fig. 3 is a cross section of a detail;

Fig. 4 is a plan view of the fifth wheel, partly broken away and in cross section;

Fig. 5 is a fragmentary plan of the tractor;

Fig. 6 is a cross section taken on the line 6—6 of Fig. 4, and

Fig. 7 is a cross section taken on the line 7—7 of Fig. 4.

Like characters of reference are employed throughout to designate corresponding parts.

In Fig. 1 there is shown a tractor comprising a frame 1 mounted upon wheels 2 and supporting a cab 3. The motive power for the tractor is derived from an internal combustion engine 4 having an intake manifold 5 in which a partial vacuum is created by the operation of the engine.

Rearwardly positioned from the cab 3 are provided two spaced brackets 6 affixed rigidly to the frame 1 to project vertically therefrom, the brackets being spaced laterally. As more clearly shown in Fig. 3 the brackets 2 are formed of spaced side members 7 and 8 having outwardly extending bosses 9 and 10 formed with co-axial bores. A fifth wheel generally designated by the numeral 11 has a pair of downwardly extending lugs 12, and the lugs on opposite sides of the fifth wheel are received between the side plates 7 and 8 of the laterally spaced brackets 6. Each lug has a bore 13 in which is received a flexible, resilient sleeve 14, preferably formed of rubber. Received within the resilient sleeve 14 is a metal sleeve 15 whose length is such that its ends abut the inner faces of the side walls 7 and 8 in like manner with the resilient sleeve. Movably received within the metal sleeve 15 is a tubular shaft 16 whose ends are received and rotatably supported in the bores in the bosses 9 and 10. Finally a bolt 17 is passed through the tubular shaft 16 and its head 18 holds a washer 19 while a nut 20 received on its other end holds a washer 21. The washers 19 and 21 are of a diameter permitting engagement with the bosses 9 and 10 respectively and therefore longitudinal movement of the tubular shaft is prevented and the parts are permanently assembled in the portion shown in Fig. 3.

The fifth wheel 11 comprises a substantially circular plate having a centrally disposed slot 22 opening rearwardly as more clearly shown in Fig. 4. A pair of angularly disposed guide arms 23 are formed integral with the fifth wheel and form a gradually enlarging continuation of the slot 22. As illustrated clearly in Fig. 2 the arms 23 slope downwardly towards their outer ends relative to a horizontal plane.

On opposite sides of the slot 22 are pivotally mounted clamping jaws 24. The jaws are mounted beneath the top surface of the fifth wheel and are partially enclosed by reinforcing webs 25 which are connected by a bottom wall 26. The reinforcing webs also serve to limit the amount of pivotal movement of the clamping jaws 24 as designated at 27 in Fig. 4. Each coupling jaw has a projecting arm 28 having one end of a coiled spring 29 connected thereto, the opposite end of the coiled spring being connected to one of the reinforcing webs 25 so that the energy stored in the spring normally tends to hold the clamping jaws in a position where they extend into the slot 22.

Beneath the top surface of the fifth wheel is formed a cylindrical chamber 30, the lower end of which is closed by a diaphragm 31 which is held in place by a cup-like cap 32 having a port 33 extending through one of the walls thereof. A fitting 34 opens into the cylindrical chamber 30 and is connected by a flexible tube 35 to a line 36 leading to a valve 37 on the dash 38 in the cab 3. The valve 37 is connected by a line 39 to the intake manifold 5. The construction of the valve has not been shown in detail because it forms no novel part of the present invention and it may be of any construction known to the art and available upon the market.

A rod 41 is slidably mounted in the cap member 32 and has its lower end pivotally connected to a bell crank 42. The bell crank is pivotally mounted at 43 on a plate 44 formed integral with the fifth wheel. The other end of the bell crank is connected by links 45 to the projecting arms 28 on the clamping jaws 24.

The numeral 46 designates a trailer frame and it will be understood that the rearward portion thereof which has been broken away, in order that the view might be rendered on a large scale, is to be supported on wheels. Such constructions are well known in the tractor-trailer art and it is therefore deemed unnecessary to illustrate the same. In the forward end of the trailer frame 1 is mounted a king pin 47 which projects downwardly beneath the plane of a skid plate 48 which is secured beneath the forward end of the frame. The skid plate 48 has an upturned guide portion 49.

The parts have been illustrated in their coupled position wherein the king pin is received in the slot 22 and its removal therefrom is prevented by the coupling jaws 24. In this position the skid plate 48 rests upon the fifth wheel and is permitted to move slidably in relation thereto around the king pin which thus serves as a pivotal connection between the tractor and the trailer. When it is desired to uncouple the tractor from the trailer the operator in the cab 3 adjusts the valve 37 so as to establish communication between the intake manifold 5 and the cylindrical chamber 30 so that a partial vacuum is created in the chamber 30. Thus a rarefied condition exists on the upper side of the diaphragm 31 and atmospheric pressure on the other side entering through the opening 33 causes movement of the diaphragm 31 to raise the rod 41 and rock the bell crank lever 42. Movement of the bell crank pushes the links 45 and pivots the coupling jaws 24 to cause them to be moved out of the slot 22 at which time the king pin is free to move out of the slot.

When it is desired to again connect the tractor to the trailer the inclined arms 23 are backed under the skid plate 48 and the arms guide the king pin into the slot 22. At this time the suction is discontinued and the urge of the springs permitted to again move the coupling jaws 24 into the slot 22. The coupling jaws are so shaped that the king pin upon entering the slot brushes them aside and after the king pin passes the jaws they are moved into their coupling position by the springs. It is obvious that when the end of the slot 22 comes into contact with the king pin that shocks are imparted to the structure. Such shocks are absorbed by the rubber mounting for the fifth wheel which provides an inexpensive cushion eliminating the expensive spring constructions ordinarily used which are subject to disorder and breakage.

Although a specific embodiment of the present invention has been illustrated and described it is to be understood that various changes may be made within the scope of the appended claim without departing from the spirit of the invention, and such changes are contemplated.

What we claim is:

A fifth wheel structure comprising a supporting plate having a pair of laterally spaced downwardly extending lugs, said lugs having aligning apertures, a pair of laterally spaced brackets receiving each of said lugs, each pair of brackets having apertures aligning respectively with the apertures of said pair of lugs for respectively receiving shafts for pivotally supporting said plate, tubular spacer members surrounding each of said shafts and spacing apart the brackets of each pair, a resilient sleeve positioned in the aperture of each of said lugs, said sleeve respectively surrounding and engaging said spacer members, and means limiting axial movement of said shafts.

SIDNEY B. WINN.